M. B. HARRISON.
DEVICE FOR LINING AND RELINING BRAKE BANDS.
APPLICATION FILED APR. 5, 1921.
1,391,894.
Patented Sept. 27, 1921.
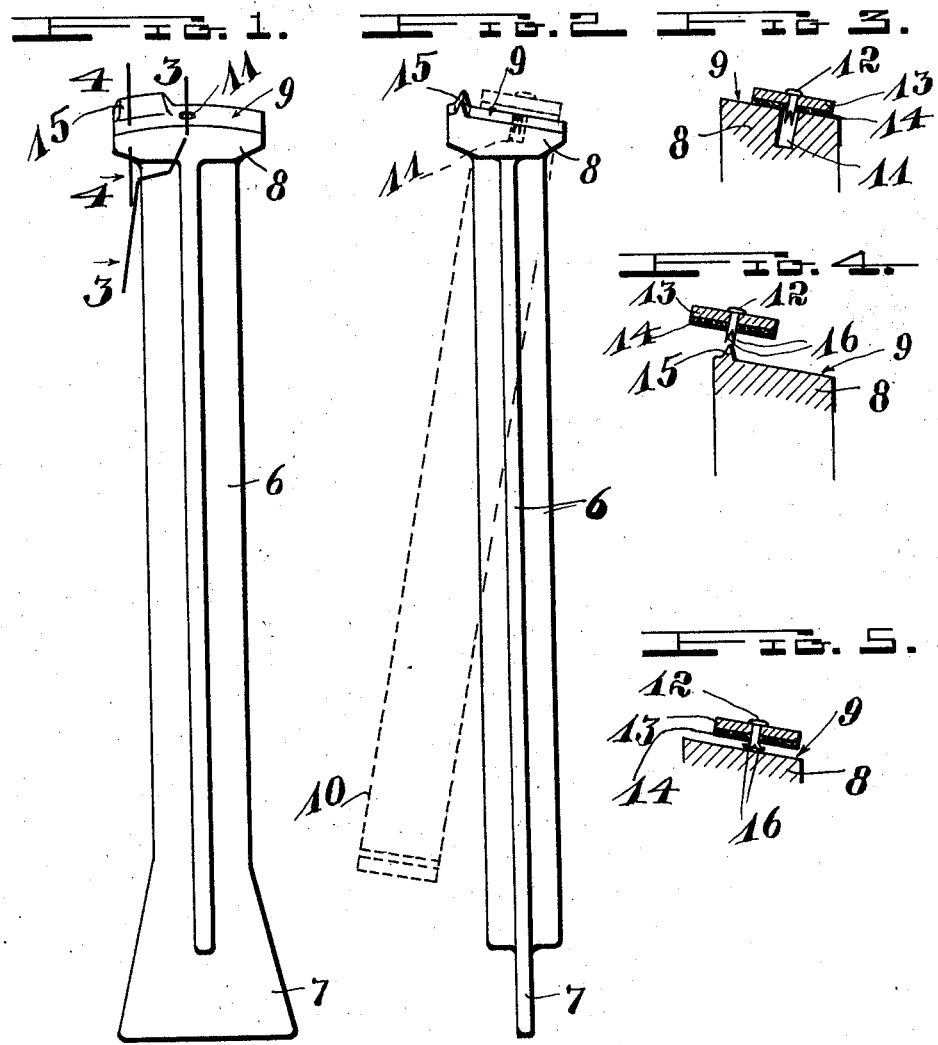
INVENTOR:
MILO B. HARRISON,
By: Otto H. Krueger
his Atty.

UNITED STATES PATENT OFFICE.

MILO B. HARRISON, OF LOS ANGELES, CALIFORNIA.

DEVICE FOR LINING AND RELINING BRAKE-BANDS.

1,391,894.  Specification of Letters Patent.  Patented Sept. 27, 1921.

Application filed April 5, 1921. Serial No. 458,724.

*To all whom it may concern:*

Be it known that I, MILO B. HARRISON, a citizen of the United States, residing at Los Angeles, in the county of Los Angeles and State of California, have invented a new and useful Device for Lining and Relining Brake-Bands, of which the following is a specification.

This invention relates to devices facilitating the applying of lining to brake bands and the replacing of the lining.

One of the objects of this invention is to provide a tool by which a lining can be applied to a brake band, including the driving of a rivet through brake band and lining, also crimping and clenching such rivet so as to securely hold the lining to the brake band.

Another object is to provide a tool by which a lining can be applied to a brake band, fully secured, requiring very little movement for the riveting, crimping and clenching.

Other objects will appear from the following description and appended claim as well as from the accompanying drawing, in which—

Figure 1 is a front elevation of the device.

Fig. 2 is a side elevation of the device, with a brake band indicated in dotted lines in proper relation to the device for driving a rivet through the brake band and through a lining to be applied.

Fig. 3 is a detail fragmentary midsectional view of the anvil portion of the device illustrating a rivet in a position driven through a brake band and lining with the end of the rivet extending into a hole in the face of the anvil portion of the device, cut on line 3—3 of Fig. 1.

Fig. 4 is a detail fragmentary sectional view cut through the wedge member of the anvil portion of the device on line 4—4 of Fig. 1, illustrating a common split rivet in a position within the brake band and lining ready to be forced over the wedge for parting the ends of the rivet.

Fig. 5 is an illustration to show the split ends of the rivet in a position ready to be clenched into the lining. In relining brake bands, it is customary to remove the brake bands from the machinery, tearing out the old lining from the bands preparatory to getting the brake bands ready for relining. For riveting the new lining in, a piece of wood is commonly used, allowing a driving of the split ends of a rivet through brake band and lining into the wood. The brake band must then be turned over to allow a parting and bending of the rivet ends so that the rivet ends may be clenched for securely holding the lining to the brake band.

To avoid such unnecessary operations and to assure a perfect riveting and clenching, the device, illustrated in the drawing, is designed so as to require only a hitting with a blunt tool, like a hammer, on the outside of the brake band, properly on the head of the rivet, for accomplishing all three operations, as the driving of the rivet through the brake band and through the lining, the parting and bending of the ends of the rivet, and the finishing clenching.

Since a hammer is preferably used for accomplishing work of this kind, an anvil is the most convenient device on which the work may be handled. The device 6 is therefore preferably designed so that the lower end 7 can be disposed in a vice or can be clamped or secured to a working bench. The upper end 8 is preferably made in form of an anvil, having a smooth rounded face 9. The face 9 is inclined to the body portion of the device so that a cylindrical or ring-like brake band may hang down sidewise of the body portion of the device, as indicated in dotted lines at 10, while the portion of the brake band through which a rivet is to be driven is resting snugly on the face 9 of the anvil portion of the device, as illustrated in Fig. 2.

A hole or recess 11 is provided in the face 9 so that a lining within a brake band may snugly rest on the face of the anvil portion of the device while a rivet 12 is driven through a brake band 13 and through a lining 14, as illustrated in Fig. 3, assuring a clean punch of the rivet through lining and brake band ready to be clenched.

A bead or wedge 15 is provided on the device in a position so that the split ends 16 of a rivet can be placed over the wedge-like member 15 after being driven through the brake band and through the lining for forcing the ends 16 apart and thereby bending the ends 16 so that they will easily clench into the inner face of the lining on the brake band.

The illustration in Fig. 4 makes it clear how the split ends 16 of the rivet 12 are placed over the wedge-like member 15. A slight hit with a hammer on top of the rivet causes the ends 16 of the rivet to part and bend to eventually the position illustrated in Fig. 5. The rivet is then placed back on the smooth face of the anvil portion of the device, and another slight hit by a hammer on the top of the rivet causes a clenching of the ends 16 of the rivet 12 and a smoothing of the inner face of the lining in the brake band.

The brake band is in this manner only moved a short distance for the three operations, first punching the rivet through lining and brake band, then moving the rivet over to be parted and bend over the wedge-like portion or member, and last moving the rivet back to a smooth portion of the face of the anvil portion of the device for clenching the rivet; punching, bending, and clenching being all accomplished on the anvil portion of the device, one operation near the other, the brake band remaining practically in the same position being only moved slightly sidewise over the face of the anvil portion of the device.

Having thus described my invention, I claim:

A device for lining and relining brake bands, consisting of the attaching portion, an upright extending upwardly from the attaching portion, an anvil top provided on the top end of the upright, the anvil having a face inclined to the upright and arch-shaped crosswise to the incline, the inclined arch-shaped top face being provided with a recess and a wedge at a distance from the recess.

In testimony that I claim the foregoing as my invention I have signed my name in the presence of two subscribing witnesses.

MILO B. HARRISON.

Witnesses:
OTTO H. KRUEGER,
JESSIE A. MANOCK.